Figure 1:
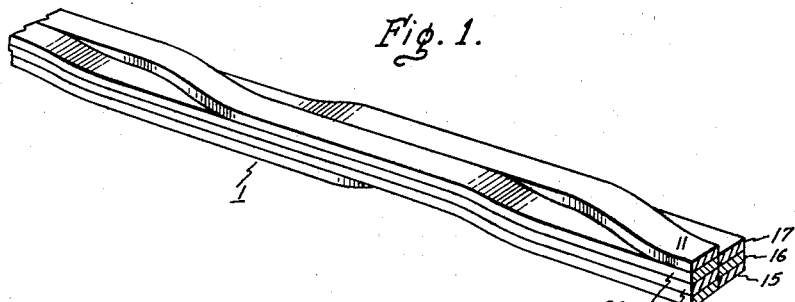

May 30, 1961 C. S. WEST 2,986,176
CABLE TRANSPOSING MECHANISM
Filed Sept. 6, 1955 2 Sheets-Sheet 1

Inventor
Clifford S. West,
by Gilbert P. Tarlton
His Attorney.

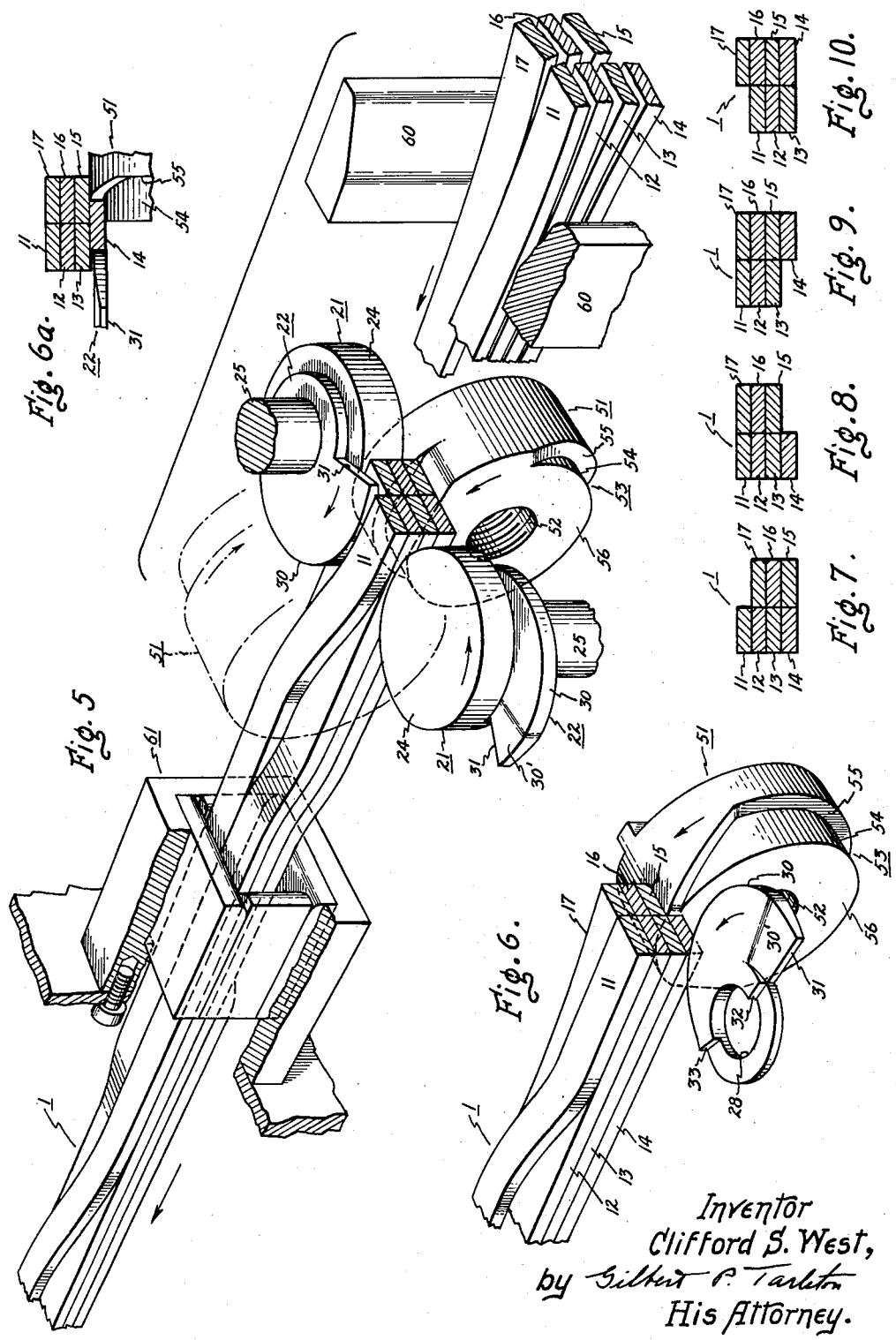

United States Patent Office 2,986,176
Patented May 30, 1961

2,986,176

CABLE TRANSPOSING MECHANISM

Clifford S. West, Adams, Mass., assignor to General Electric Company, a corporation of New York Filed Sept. 6, 1955, Ser. No. 532,412

4 Claims. (Cl. 140—71)

This invention relates to a cable transposing mechanism, and more particularly, to a mechanism for transposing the individual rectangular strands of a stranded cable about the lengthwise axis of said stranded cable.

One prior art form of cable transposing mechanism employs a plurality of fingers or the like to transpose the strands of a stranded conductor. The stranded conductor moves in a lengthwise direction through the cable transposing mechanism and the fingers engage the strands in a direction perpendicular to the lengthwise axis of the conductor. One form of such prior art cable transposing mechanism is shown in Patent 2,249,509 assigned to the same assignee as the instant patent application.

In such prior art form of cable transposing mechanism, inasmuch as the fingers move perpendicular to the lengthwise direction of cable travel, the speed of cable travel and transposition is limited. If the cable is traveling too fast the fingers scratch the strands and the transposing mechanism is apt to jam.

Besides eliminating abrasion of the strands and likelihood of jamming, it is also desirable for the opening within the cable transposing mechanism to be identical to the transverse cross sectional outline of the stranded cable at all times so as to confine the strands and provide them with backing. Backing for the individual strands is particularly desirable during the sidewise transposition thereof to avoid binding thereof on an adjacent laterally positioned strand.

It is an object of this invention to provide a cable transposing mechanism which will overcome the heretofore discussed disadvantages of prior art cable transposing mechanisms and provide the heretofore discussed desirable features for cable transposing mechanisms.

It is a further object of this invention to provide a cable transposing mechanism having strand transposing elements which will not scratch or scuff the strands.

It is a further object of this invention to provide a cable transposing mechanism which will permit a more rapid rate of conductor travel and strand transposition than attainable with prior art cable transposing mechanisms.

It is a further object of this invention to provide a cable transposing mechanism which will at all times provide an opening therein identical to the transverse cross sectional outline of the stranded conductor and confine the strands therein.

It is a further object of this invention to provide a cable transposing mechanism which will provide the individual strands with back up pressure during the transposition thereof.

I have discovered that a rolling contact between the strands and the strand transposing elements of a cable transposing mechanism produces minimum abrasion of the strands whereby the rate of cable travel and strand transposition can be safely accelerated over that permissible with prior art cable transposing machines with practically no danger of strand scratching or scuffing. Additionally, I have discovered that by the utilization of appropriately contoured rotary cams the opening within the cable transposing mechanism can at all times be made identical to the transverse cross sectional outline of the stranded cable thereby at all times confining the strands and providing them with backing during their period of transposition with very little likelihood of jamming or damage to the strands.

My invention comprises a cable transposing mechanism having a plurality of forming or transposing elements whose engagement with the strands is substantially a rolling contact engagement.

My invention further comprises a cable transposing mechanism having a plurality of forming or transposing elements whose contact with the strands is substantially of a rolling contact nature, said elements being so configured whereby the opening within said mechanism for said strands is at all times identical to the transverse cross sectional outline of the cable.

My invention further comprises a cable transposing mechanism having a plurality of forming or transposing elements which are so configured whereby the opening within said mechanism for said cable is at all times identical to the transverse cross sectional outline of the stranded cable.

My invention further comprises a cable transposing mechanism having a plurality of forming or transposing elements which are so configured and actuated whereby the strands are provided with back up pressure during their period of transposition.

The features of my invention which I believe to be novel are set forth with particularity in the appended claims. My invention itself, however, both as to its organization and method of operation, together with further objects and advantages thereof, may best be understood by reference to the following description taken in connection with the accompanying drawings.

Figure 2:
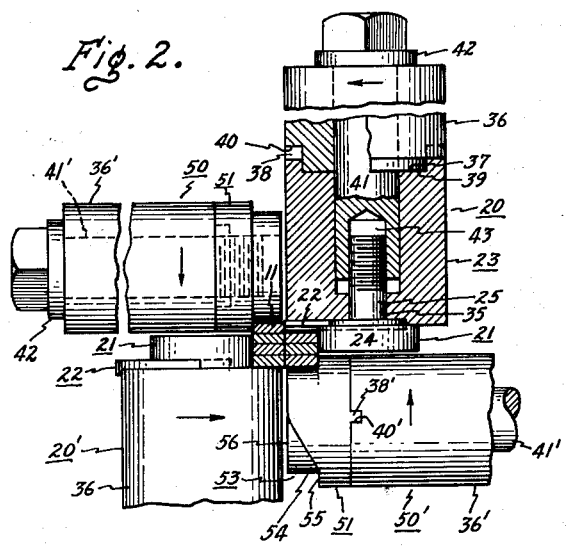
Figure 3:
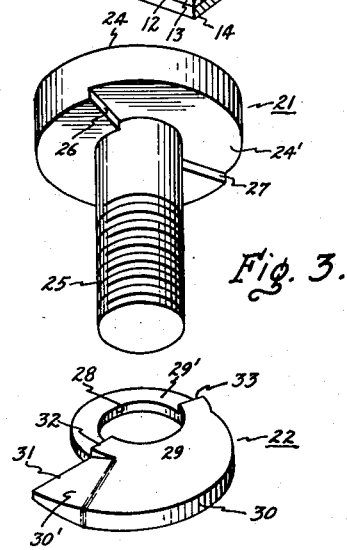
Figure 4:
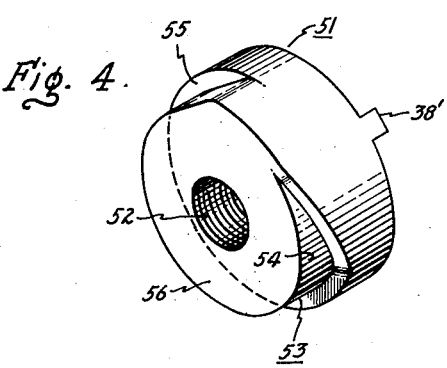

In the drawings, Fig. 1 is a perspective view of a portion of a stranded cable or conductor having the strands thereof transposed. Fig. 2 is a broken away front elevation view of one form of my invention. Fig. 3 is an exploded perspective view of one of the vertical forming or transposing element assemblies of my invention. Fig. 4 is a perspective view of one of the horizontal cam forming or transposing elements of my invention. Fig. 5 is a broken away perspective view of my one form of invention, the position of the parts thereof being identical to that shown in Figs. 2 and 7. Fig. 6 is a broken away perspective view of my invention with the parts thereof positioned in readiness to effect the transposition illustrated in Figs. 8 to 9. Fig. 6a is a broken away front view of my invention with the parts thereof disposed in the positions they occupy in partial fulfillment of the transposition shown in Figs. 8 to 9. Figs. 7 to 10 inclusive are a diagrammatic illustration of the sequence or steps of transposition. Like reference numerals will be used throughout the various figures to indicate like parts.

Referring now to the drawings, illustrated in Fig. 1 is a stranded cable or conductor 1, and illustrated in Figs. 7 to 10 is the sequence of transposition. The cable or conductor 1 has seven strands 11 to 17 inclusive, however, the cable may have any desired odd number of strands. Each of strands 11 to 17 is rectangular in transverse cross section, but as will be more clear hereinafter, my invention can also be used for the transposition of strands that are square in cross section. The odd number of strands 11 to 17 inclusive are stacked in two side by side groups of four and three strands whereby the width of the conductor 1 is equal to twice the width of any individual strand and the maximum height of the conductor is equal to four times the thickness of any individual strand. The sequence of transposition is to periodically transpose the strands in a counterclockwise direction, when viewing Figs. 7 to 10, about the lengthwise axis of the conductor 1.

In Figs. 2, 5 and 7 the strand 11 has just been transferred or transposed from the right-hand group or stack of strands to the left-hand group or stack of strands. In this position of the strands the forming or transposing elements of the cable transposing mechanism define an opening equal to the transverse cross sectional outline of the conductor 1. This is probably best seen in Fig. 2.

There are four strand transposing element assemblies. Two of them, indicated by reference numerals 20 and 20', are identical and have their axes vertically disposed; and another two of them indicated by reference numerals 50 and 50', are also identical and have their axes horizontally disposed. The exploded vertical transposing assembly shown in Fig. 3 more nearly corresponds to the assembly 20' of Fig. 2. However, it will be understood that what is said with respect to either vertical assembly 20 or 20' applies equally well to the other inasmuch as they are identical to each other in construction, although reversed in position.

Each of the vertical transposing assemblies 20 and 20' comprises a pilot cam 21, a transposing cam 22, and a carrier 23. The pilot cam 21 has a cylindrical cam head 24 and a threaded stud 25. The underside of the head 24 is cut away for an angular distance of less than 180 degrees about stud 25 to define a groove 24' terminating at shoulders 26 and 27.

The cam 22 has an aperture 28 therein, defined by an annular or ring part 29 and 29', and a cam portion 30 which is integral with the portion 29. The center of aperture 28 represents the axis of cam 22 and the cam portion 30 gradually decreases in width from a maximum adjacent a trailing end or edge 31 to a minimum or zero width adjacent its opposite and leading end or edge where it merges with the portion 29. A portion of the ring part 29 and 29', identified by reference numeral 29', is made thinner than the portion 29 and cam portion 30 to define two shoulders 32 and 33. When the cam 22 is slipped about the stud 25 the shoulders 32 and 33 will mate with shoulders 26 and 27 respectively.

The carrier 23 is a hollow cylindrical member having one end thereof partially closed by an apertured flat end wall having a groove 34 and aperture 35 formed therein. The center of aperture 35 represents the axis of the groove 34 and the groove 34 is identical in outline to the outline of the cam 22. When the stud 25 with the cam 22 positioned thereon is inserted into aperture 35 the cam 22 will seat in groove 34. The diameter of carrier 23 is greater than the diameter of cam head 24 and the end wall of carrier 23 and the cylindrical side wall of head 24 together form a right angle guide ledge for the upper strands of the right-hand group and the lower strands of the left-hand group when viewing Fig. 2.

The carrier 23 is centered and coupled with respect to a hollow drive shaft 36 by virtue of a shoulder 37 and tongues 38 formed on carrier 23 which mate with a shoulder 39 and keyways 40 respectively formed on one end of shaft 36. A stud 41 having a collar 42 formed on one end thereof is positioned within the hollow shaft 36. The opposite end of stud 41 has an internally threaded blind bore 43 formed therein which will threadably engage the threaded stud 25.

The cam shown in Fig. 4 corresponds to the cam of the horizontal assembly 50'. However, since assemblies 50 and 50' are identical, although reversed in position, what is said with respect to one of them applies equally well to the other. Each of the horizontal transposing assemblies 50 and 50' comprises a cam 51 which is also driven by a hollow drive shaft 36'. The shaft 36' is identical to shaft 36 heretofore described, and interlocks with one end or side of cam 51 in a manner identical to the drive interlock between carrier 23 and shaft 36. For instance, cam 51 has tongues 38' which interlock with keyways 40' of shaft 36'. Also, cam 51 has a shoulder identical to shoulder 37 which centers with respect to a shoulder of shaft 36' identical to the shoulder 39.

The cam 51 has a central aperture 52 formed therein which is internally threaded. The shaft 36' receives a stud 41' which is similar to stud 41 except that the inner end of stud 41' is externally threaded. This externally threaded inner end of stud 41' threads into the threaded aperture 52 whereby the cam 51 is securely held on shaft 36'.

The cam 51 is a cylindrical member and a peripheral shoulder 53 is cut away in the end thereof opposite to the end having the tongues 38'. The shoulder 53 does not extend completely about the cam 51 but for slightly less than 360 degrees. For instance the shoulder has a side wall 54 and a bottom wall 55. At the left-hand end of shoulder 53, when viewing Fig. 4, the side wall 54 slopes to merge flush with the exterior cylindrical surface of cam 51. The side wall 54 has a uniform height except that at its right-hand end, when viewing Fig. 4, it tapers to zero height inasmuch as at its right-hand end the bottom wall 55 commences at the flat end face 56 of cam 51 and then slopes away from face 56. The bottom wall 55 has a uniform width except that at its left-hand end it tapers to zero width inasmuch as the left-hand end of wall 54 slopes to merge with the exterior cylindrical surface of cam 51.

In actual practice the shafts 36 and 36' and studs 41 and 41' are much longer than illustrated in Fig. 2. These shafts 36 and 36' have gears thereon which are driven by a drive gear in a manner obvious to those skilled in the art whereby all of the four strand transposing assemblies 20, 20', 50, and 50' are driven in synchronism at uniform speed in the direction of the arrows printed thereon. The central portions of shafts 36 and 36' and said gearing has been broken away inasmuch as any suitable means for driving the four strand transposing assemblies in synchronism can be employed.

When viewing Fig. 2 it will be seen that the transposing assemblies 20, 50', 20' and 50 are positioned within the four different quadrants respectively disposed about the lengthwise axis of the stranded conductor. For instance, the assembly 20 is positioned in the upper right-hand quadrant, and the assemblies 50', 20' and 50 in the lower right-hand, lower left-hand, and upper left-hand quadrants respectively. The assembly 20' is reversed with respect to the assembly 20 and lags or is out of phase with the assembly 20 by 180 degrees, and the assembly 50' is reversed with respect to the assembly 50 and lags or is out of phase with the assembly 50 by 180 degrees.

In Fig. 5 are illustrated a pair of advance side guides 60 which gather the cone of strands 11 to 17. The strand 11 has just been transposed by the right-hand cam 22 from the right-hand stack of strands 15 to 17, see Fig. 7, to the left-hand stack of strands 12 to 14. Throughout this left-hand lateral transfer the strand 11 has been backed up by the sloping portion of bottom wall 55 of the left-hand cam 51, and has been superposed by the tapered portion of side wall 54 of the left-hand cam 51. The uniform portion of shoulder 53 of the left-hand cam 51 will continue to embrace the strand 11 until it is time for the strand 11 to be pushed down, see Figs. 9 to 10, at which point the opposite end of shoulder 53 of the left-hand cam 51 will come into play.

During the left-hand transposition of strand 11, the strands 12, 13 and 14 have been confined by the upper surface of left-hand carrier 23 and the outer cylindrical surface of pilot head 24 of the assembly 20', and the strands 15 to 17 have been confined by the uniform portion of shoulder 53 of right-hand cam 51, as well as the cam portion 30 and the outer cylindrical surface of pilot head 24 of the assembly 20. Thus, the opening defined by the strand transposing assemblies is identical in outline to the transverse cross sectional outline of the cable 1.

While the left-hand transfer of strand 11 is being completed a relieved portion 30' of the right-hand cam 22 comes into play to relieve the pressure on the right-hand stack of strands 15 to 17 so that the transfer sequence shown in Fig. 8 can be performed by the right-hand cam 51. This is probably best seen in Fig. 5. After a slight additional degree of rotation of right-hand cam 22 and right-hand cam 51 the sloping portion of side wall 54 and the cylindrical exterior surface of right-hand cam 51 will have raised the stack of strands 15 to 17 from the position shown in Fig. 7 to the position shown in Fig. 8. After this operation is completed the strands 15 to 17 will be confined by the end surface of carrier 23 and the cylindrical surface of pilot head 24 of the assembly 20 as well as the cylindrical surface of right-hand cam 51.

By now the lower cams 22 and 51 will be positioned as illustrated in Fig. 6 to perform the transposition illustrated in Figs. 8 to 9. Said transposition is illustrated as being about half completed in Fig. 6a. Figs. 6 and 6a show how at all times during the lateral transposition of strand 14 it is backed up by the bottom wall 55 of the right-hand cam 51.

After the transposition of Figs. 8 to 9 is accomplished the relieved portion 30' of the cam portion 30 of Figs. 6 and 6a permits the sloping portion of the side wall 54 of left-hand cam 51 to commence the transfer shown in Figs. 9 to 10. The exterior cylindrical surface of left-hand cam 51 disposed between opposite ends of the shoulder 53 thereof completes the transposition of Figs. 9 to 10. Now the upper cams 30 and 51 will be properly positioned to move the strand 17 of Fig. 10 to the left in the manner heretofore described with respect to the left-hand lateral transposition of strand 11.

It will be noted from a perusal of Figures 7–10 that the various rectangular strands 11—17 of the cable 1 are transposed or shifted by the co-action of the members 20, 20' and 50, 50' in a vertical or horizontal direction only. In this manner the various strands of the cable 1 are not twisted about their own axis and the various surfaces of each strand always maintain the same relative position with respect to cable 1. That is, the upper surface, for example, of each strand always remains the upper surface of such strand regardless of the actual position of the strand within the stranded cable 1.

After the transposed strands leave the transposing mechanism they pass through a rear guide assembly 61 after which they may be bound together by insulating tape. Inasmuch as the strands are continuously being transposed in a counterclockwise direction about the lengthwise axis of the cable or conductor it will be obvious that means must be provided for continuously rotating the strands 11 to 17 in a counterclockwise direction ahead of the advance side guides 60 as well as means for retaining the strands 11 to 17 aligned with respect to each other in parallel planes lest they become twisted. A form of such means as well as a form of means for taping the conductor behind the rear guide assembly 61 which can be used with my transposing mechanism is disclosed in heretofore mentioned Patent 2,249,509.

After the stranded cable 1 is taped together behind the rear guide assembly 61 it is wound on a driven reel. This driven reel pulls the strands comprising the cable 1 through the advance side guides 60, the transposing element assemblies 20, 50', 20' and 50, and the rear guide assembly 61. That is, in my illustrated form of the invention the transposing element assemblies 20, 50', 20' and 50 do not drive or push the cable 1 but only transpose the strands thereof. It will be understood, however, that it is within the scope of my invention to have the transposing element assemblies drive the cable 1. In the instant form of the invention the arrangement is otherwise since the rear guide assembly 61 which confines the transposed strands prior to taping imposes a drag on the cable 1, and I therefore prefer to pull instead of push the cable 1 through the rear guide assembly 61.

In my invention the contact between the transposing elements and the transposed strands is substantially of a rolling nature. That is, there is minimum drag or scuff between the transposing elements and the strands. This is so for several reasons. For instance, the transposing elements are not fixed with respect to the direction of conductor travel as in heretofore mentioned Patent 2,249,509, but are rotated in the same direction as that of conductor travel. Additionally, the transposing element assemblies are rotated in synchronism with the speed of conductor travel so that the transposing surfaces of the transposing elements have a linear rate of speed substantially equal to that of the conductor. For instance, the transposing element assemblies are rotated so that the circumferential edges of cam portions 30 as well as the sloping portion of the side walls 54 of elements 51 are traveling as much as possible at the same linear speed as that of the cable 1. This is because it is the circumferential edges of the cam portions 30 as well as the sloping portions of the side walls 54 of elements 51 that do the actual work of transposition, and it is at the moment of contact between the strands and said circumferential edges and sloping portions that the greatest amount of damage to an insulating coating on the strands can be done unless there is practically no drag or scuff between the strands and said edges and portions. It will be appreciated that due to the configuration of said edges and portions it is very difficult to entirely eliminate any possible drag or scuff. However, an insulation coating on strands transposed with my invention has been undamaged so it is believed that my invention probably entirely eliminates drag or scuff and provides substantially or almost pure rolling contact between the transposing elements and the strands.

Additionally, in the practice of my invention each of the strands of the cable are individually unrolled in the manner of heretofore mentioned Patent 2,249,509 from separate reels of wire which are not braked if during a particular transposition period a greater length is required in one strand than in the other strands. For instance, it will be noted that when the strand 11 is being transposed laterally in a left-hand direction, though the projected lengths of all of the strands are equal, the actual length of strand 11 is slightly longer than that of the others and is equal to the length of the circumferential edge of right-hand cam portion 30. When this extra length for strand 11 is needed it is provided from the unbraked reel thereof and said extra length is not provided by deformation or stretching of strand 11 by cam portion 30.

It will be noted that other strand contacting surfaces of the transposing element assemblies have different radii of curvature than that of the cam portions 30 and the sloping portions of walls 54 of elements 51. For instance, the external cylindrical surfaces of pilot heads 24 and the uniform portions of the walls 54 of elements 51 have smaller radii than that of cam portions 30 and the sloping portions of walls 54 respectively. However, in my invention these other surfaces are assigned radii as nearly equal to the radii of the cam portions 30 and the sloping portions of walls 54 as possible to also minimize drag or scuff at these other surfaces. It will be apparent to those skilled in the art that factors such as the size of the strands and the spacing between transpositions will affect the degree to which the radii, and therefore the linear speed, of all strand contacting surfaces can be made as nearly equal as possible. Nevertheless, despite the difference in radii or linear speed of travel of these other strand contacting surfaces from the radii of the cam portions 30 and the sloping portions of walls 54, practice has shown that it is more important to ensure that the linear speed of travel of the cam portions 30 and the sloping portions of walls 54 be made as nearly equal as possible to the linear speed of travel of the cable 1. Also, though equal radii and linear speeds of travel for all strand contacting surfaces is a desirable precaution against drag or scuff, practice has shown that no harm is done to an insulating coating on the strands though there is a substantial difference in the radii or linear speed of travel of said other surfaces. This is because these other surfaces do not perform the actual work of transposition, but serve as backing for transposed strands and means for helping to define an aperture equal at all times to the transverse cross sectional outline of the cable so as to support the strands. However, if in some particular case it is found to be desirable to make the linear speed of said other surfaces equal to the linear speed of the actual strand transposing surfaces this can be done by making said other surfaces free wheeling or spinning. For instance, the pilot head 24 could be mounted in a free wheeling or spinning manner on the stud 25.

While there has been shown and described a particular embodiment of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A machine having means for transposing the rectangular strands of a stranded conductor about its lengthwise axis, said means comprising a plurality of rotatably mounted members, said members having curved surfaces making substantial rolling contact with said conductor and which co-act to transpose said rectangular strands by sequentially shifting them in a horizontal or vertical direction only, such that the upper surface of each of said rectangular strands is always maintained as the upper surface of each of said strands regardless of the position of said strands within the stranded conductor, and said members having other curved surfaces which simultaneously apply back up pressure to said strands in a direction opposite to that from which they are being shifted.

2. A machine having means for transposing the rectangular strands of a stranded conductor about its lengthwise axis, said means comprising a plurality of rotatably mounted members, said members having curved surfaces making substantial rolling contact with said conductor and which co-act to transpose said rectangular strands by sequentially shifting them about said axis in a horizontal or vertical direction only, such that the upper surface of each of said rectangular strands is always maintained as the upper surface of each of said strands regardless of the position of said strands within the stranded conductor, and said members having other curved surfaces which simultaneously apply backing for said strands as they are being shifted, said curved surfaces making substantially rolling contact engagement with said strands, and said members defining an opening therebetween which is at all times generally identical to the transverse cross-sectional outline of said conductor.

3. A machine having means for sequentially transposing the strands of a lengthwise moving stranded conductor along its length and about its axis, said means comprising four strand transposing assemblies which surround and at all times confine said conductor along all the sides of its cross-sectional outline, said assemblies being rotatably mounted and driven in synchronism for substantially rolling contact with said conductor, and said assemblies comprising curved rotary cams which coact to transpose said strands by shifting them while simultaneously backing them up as they are being shifted.

4. A machine having means for transposing the strands of a lengthwise moving stranded conductor about the axis thereof, said means comprising four cam elements which are disposed in four different quadrants surrounding said axis, each pair of diametrically opposite cams having identical curved surfaces which transpose said strands and are displaced from each other by 180 degrees of rotation, and means for rotating said four cams in synchronism whereby said curved surfaces have a linear speed substantially equal to the linear speed of said moving conductor.

References Cited in the file of this patent

UNITED STATES PATENTS

| | | |
|---|---|---|
| 1,664,231 | Thomas | Mar. 27, 1928 |
| 2,189,646 | Betzler | Feb. 6, 1940 |
| 2,234,996 | Welch | Mar. 18, 1941 |
| 2,438,178 | Malhiot | Mar. 23, 1948 |
| 2,595,655 | Hannay | May 6, 1952 |
| 2,738,161 | Chupp | May 13, 1956 |

FOREIGN PATENTS

| | | |
|---|---|---|
| 673,480 | Germany | Sept. 22, 1936 |
| 708,868 | Great Britain | May 12, 1954 |